Dec. 3, 1935.  J. J. DOWNEY ET AL  2,023,315
DOUGH CUTTING GRAIN CONVERTER
Filed March 4, 1935  2 Sheets-Sheet 1

Inventors
James J. Downey
Charles I. Bledsoe
Neal Henson
By
J. Kaplan
Attorney

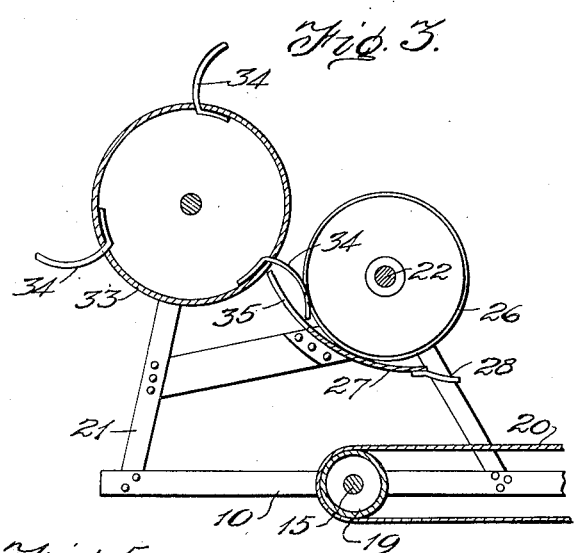
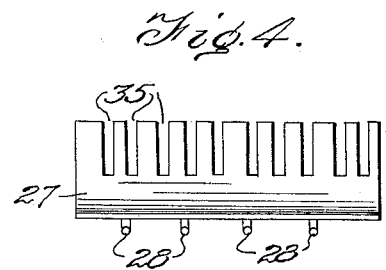
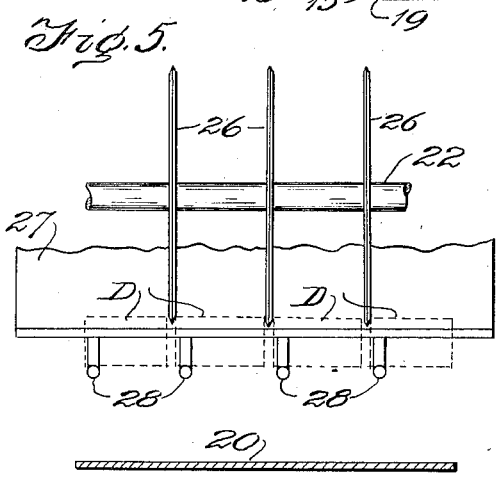
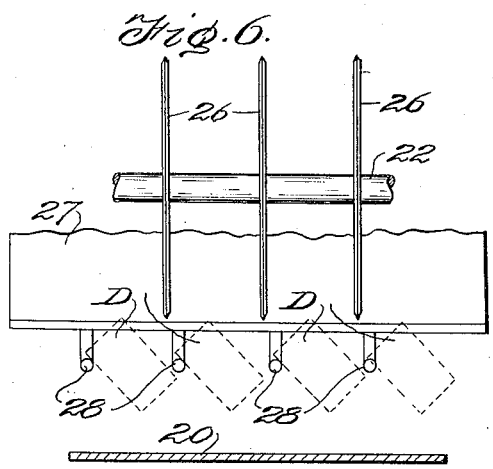
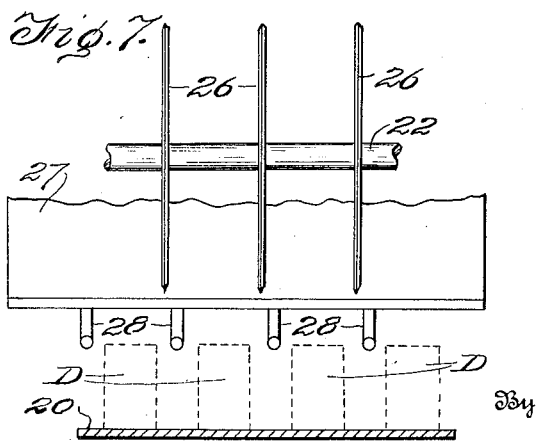

Patented Dec. 3, 1935

2,023,315

UNITED STATES PATENT OFFICE 2,023,315

DOUGH CUTTING GRAIN CONVERTER

James J. Downey, Charles I. Bledsoe, and Neal Henson, Chattanooga, Tenn.

Application March 4, 1935, Serial No. 9,308

2 Claims. (Cl. 107—22)

This invention relates to dough cutting machines preferably termed a dough grain converting machine.

One important object of the invention is to provide a novel and improved machine for cutting dough into sections as it is delivered from the molder common in bakeries.

A second important object of the invention is to provide an improved machine for cutting the cake of dough as it is delivered from the molder, the machine being arranged to turn the cut sections through 90° and deposit them in turned position on a conveyor thus preparing the texture of the raw cake so that, when cooked, the texture is more closely knit together than ordinarily obtained and the cooked article has less air holes than the usual loaf bread.

A third object of the invention is to provide a machine of this kind arranged to cause exposure of the cut surface to the air whereby bread with a fine texture is produced when the loaf is cooked.

With the above and other objects in view, the invention consists in general of certain novel details of construction and combinations of parts hereinafter fully described, illustrated in the accompanying drawings and specifically claimed.

In the accompanying drawings like characters of reference indicate like parts in the several views, and;

Figure 3 is a detail section on the line 3—3 of Figure 2.

Figure 4 is a detail showing the plate for supporting the dough while being cut.

Figure 5 is a semi-diagrammatic elevation showing the pieces of dough severed and at the lower edge of the supporting plate.

Figure 6 is a view similar to Figure 5 but showing the manner in which the dough sections are tilted by certain pins forming parts of the invention.

Figure 7 is a view similar to Figure 5 but showing the dough deposited on the conveyor.

Figure 1:
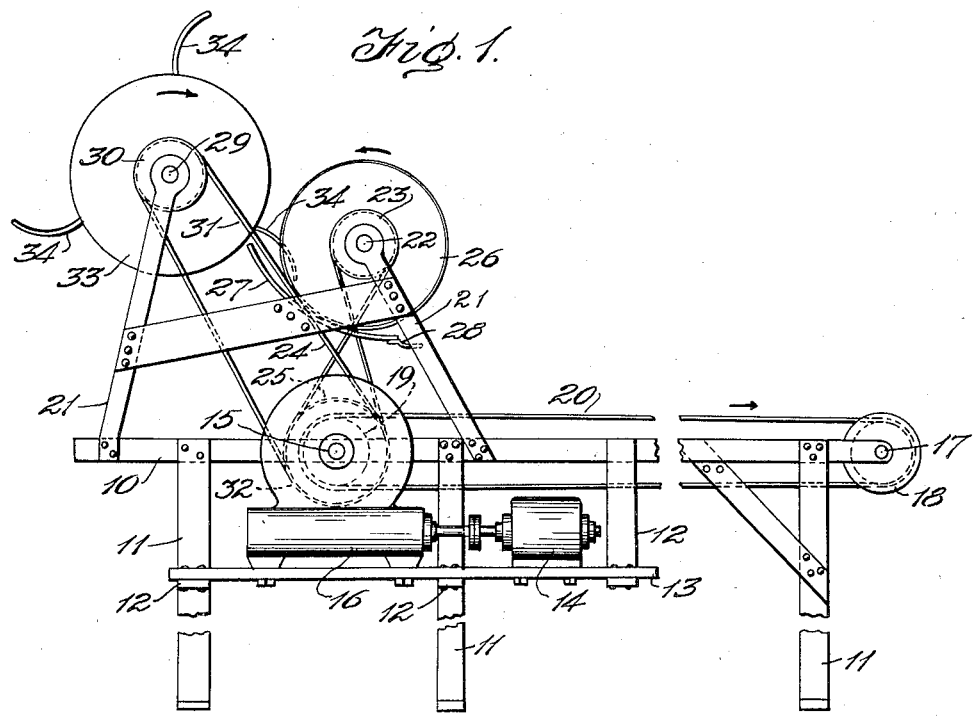
Figure 1 is a side elevation of the invention with parts of the conveyor and legs broken away.
Figure 2:
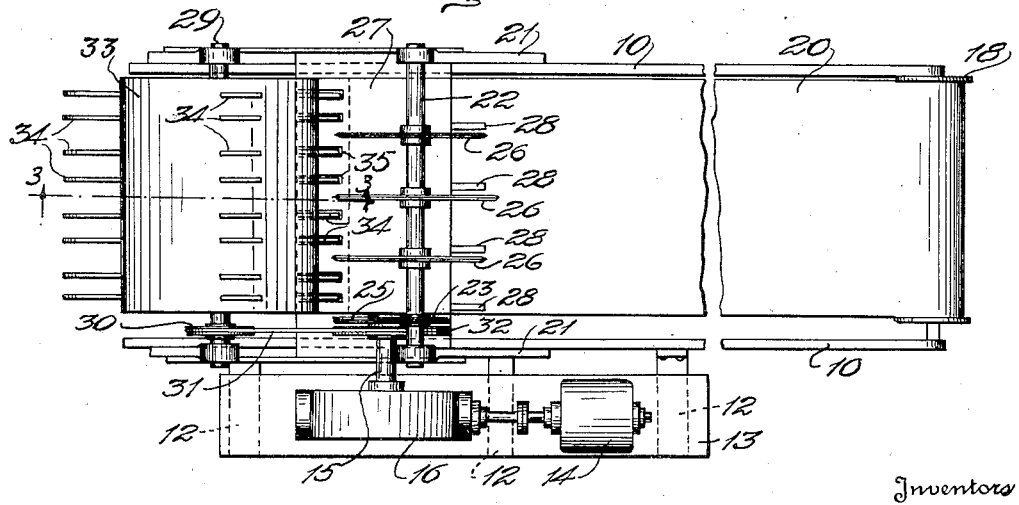
Figure 2 is a plan view thereof.

While one embodiment of the invention is here shown it is to be understood that other embodiments varying in details and proportions may be constructed. In the present embodiment there is provided a main frame 10 supported at a convenient height by legs 11. Brackets 12 at one side of the rear portion of the machine support a platform 13 whereon is mounted a motor 14. This motor 14 drives a shaft 15 through the medium of a reduction gear the casing of which is shown at 16, it not being deemed necessary to show the gearing itself as any of the well known gearings, such as a worm gearing, may be used for the purpose of driving the shaft 15 slowly. At the front end of the frame 10 there is journalled a shaft 17 carrying a drum 18 and a similar drum 19 is fixed on the shaft 15. Around these drums 18 and 19 is trained a belt 20.

Extending up from each side of the frame 10 is an auxiliary frame 21 wherein is journalled a shaft 22. On the shaft 22 is fixed a pulley 23 which is connected by a crossed belt 24 with a pulley 25 fixed on the shaft 15. The shaft 22 also carries a series of spaced cutting disks 26 which cooperate with a curved or concave plate 27 in cutting the molded dough. The concave plate 27 is supported on the auxiliary frame 21 and is arranged in a downwardly and forwardly inclined position so that, as the cutting disks revolve in an anticlockwise direction (Figure 1) the dough will pass down the concave plate 27 beneath the disks 26 and be cut in a number of pieces.

Projecting forwardly from the concave plate 27 is a series of pins 28, these being spaced like the disks 26 and all but one of the pins being arranged in closely spaced relation to its disk so that the cut pieces of dough D will pass from the plate 27 onto these pins in the position shown in Figure 5. Being unbalanced in such position, the dough pieces D will tilt downwardly at their unsupported ends as in Figure 6 and finally will slip off the pins onto the belt 20 in a vertical position with their cut sides at the top and bottom as in Figure 7.

The auxiliary frame 21 also supports a shaft 29 whereon is fixed a pulley 30 connected by a belt 31 with a pulley 32 fixed on the shaft 15. On the shaft 29 is fixed a feeder cylinder 33 which revolves in clockwise direction Figure 1 and is provided with a series of rows of arcuate dough supporting fingers 34. These fingers receive the dough in long rolls from the usual molder (not shown as the same forms no part of the present invention) and deliver it to the upper end of the concave plate 27, the fingers 34 passing through slots 35 extending inwardly from the upper end of the said concave plate.

Thus the dough is received from the molder, delivered to the concave plate, passes beneath the disks which cut it into pieces and is turned on end and deposited on the conveyor to be conveyed to the front end of the machine. From the conveyor these pieces are removed and placed in pans by manual operation and are then taken to the proof box and from thence to the baking oven.

There has thus been provided a simple and efficient device of the kind described and for the purpose specified.

It is obvious that changes may be made in the form and construction of the invention without departing from the principles involved. It is not therefore desired to confine the invention to the exact form herein shown and described, but it is desired to include all such forms as come within the scope of the appended claims.

What is claimed is—

1. In a machine of the kind described, a conveyor, a concave plate mounted above the rear portion of the conveyor, a series of cutter disks mounted above the plate for rotation and cooperating with the plate to cut rolls of dough into sections, and means at the forward end of said plate to receive the dough sections to turn them to vertical position and deposit them on the conveyor.

2. In a machine of the kind described, a conveyor, a concave plate mounted above the rear portion of the conveyor, a series of cutter disks mounted above the plate for rotation and cooperating with the plate to cut rolls of dough into sections, and pins projecting forwardly from said plate in position to each support a dough piece near one end as it passes off the plate.

JAMES J. DOWNEY.
CHARLES I. BLEDSOE.
NEAL HENSON.